Feb. 26, 1963
R. DAY
3,078,840
WATER HEATING DEVICE FOR LIVESTOCK TANKS
Original Filed June 8, 1955
2 Sheets—Sheet 1
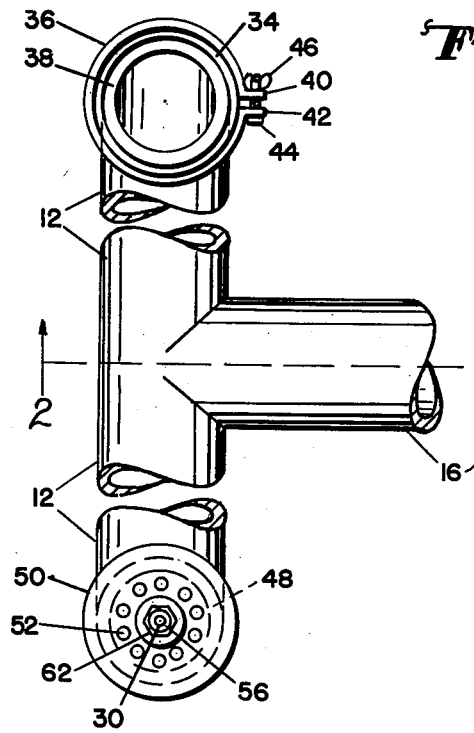
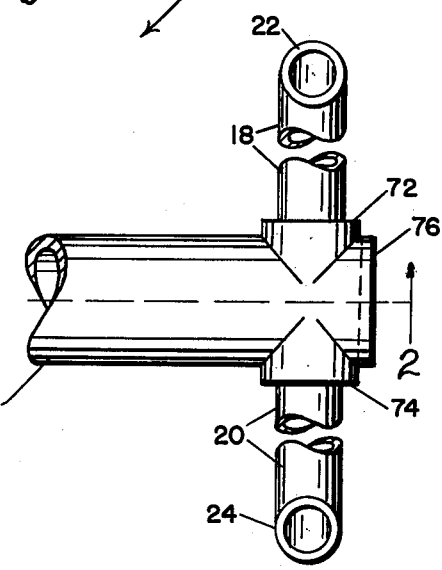
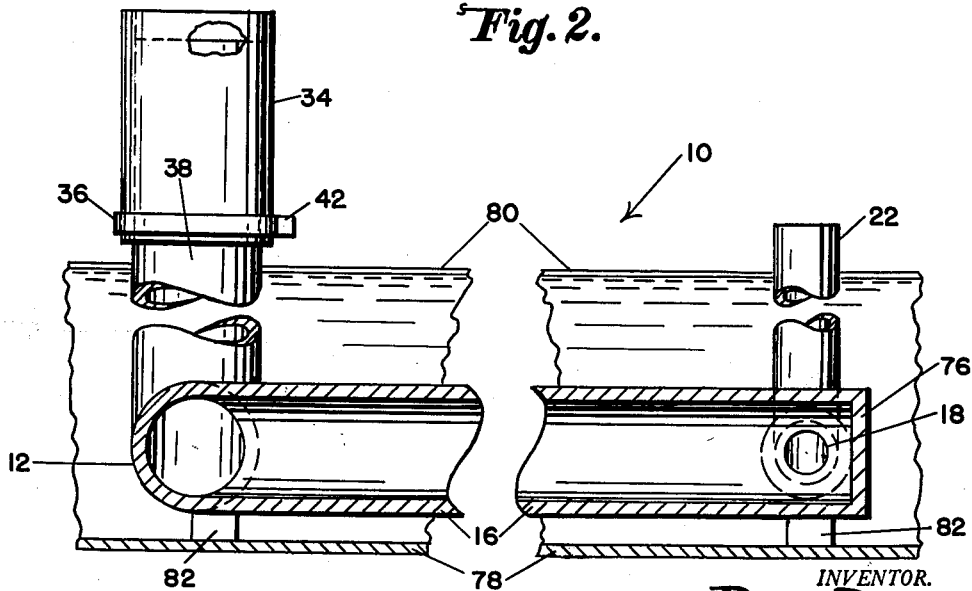
INVENTOR.
Roy Day
BY Arthur H. Sturges.
Attorney Feb. 26, 1963 R. DAY 3,078,840
WATER HEATING DEVICE FOR LIVESTOCK TANKS
Original Filed June 8, 1955 2 Sheets-Sheet 2
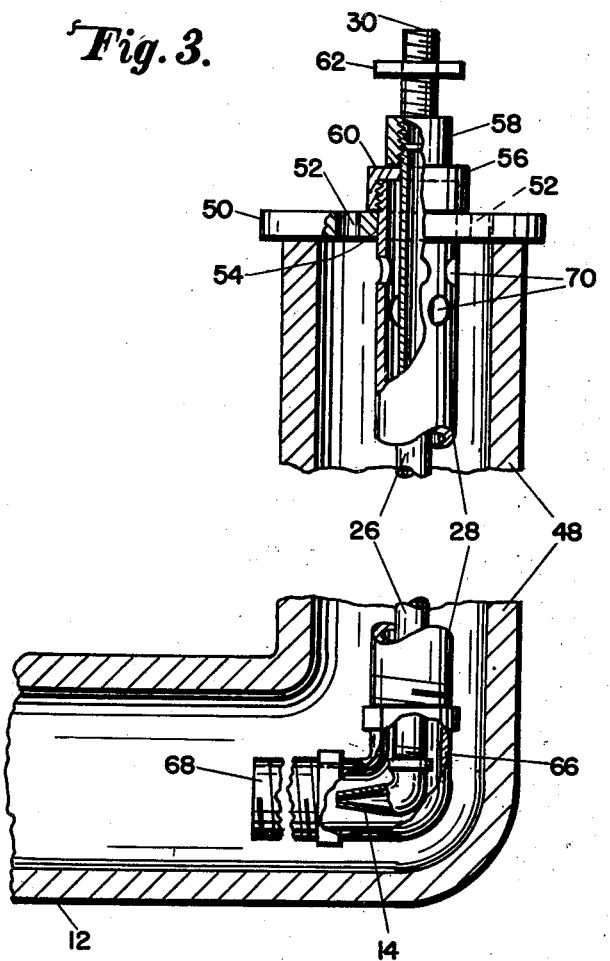
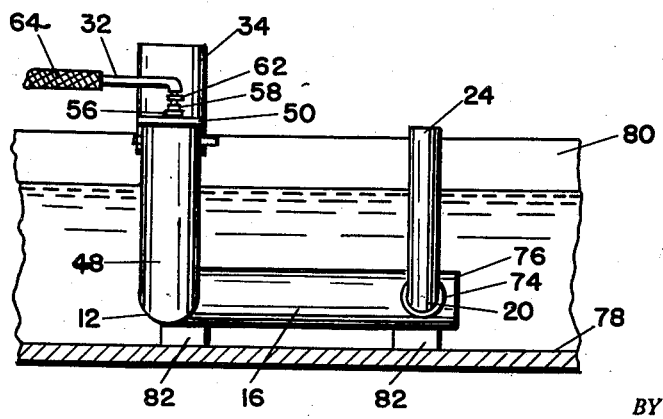
INVENTOR.
Roy Day
BY Arthur H. Sturges,
Attorney ved Feb. 26, 1963

3,078,840
WATER HEATING DEVICE FOR
LIVESTOCK TANKS
Roy Day, Wymore, Nebr.
Continuation of application Ser. No. 514,031, June 8,
1955. This application Apr. 20, 1959, Ser. No. 807,712
3 Claims. (Cl. 126—360)

This invention relates to water heaters and more adapted to be submerged in water tanks and more particularly it is an object of this invention to provide a water heater which is adapted to receive air from more than one air tube means for providing sufficient oxygen for good burning and for the prevention of the snuffing out of the flame.

More particularly my concept is to provide a more dependable heater less likely to go out. When a flame goes out this permits the tank to freeze, preventing cattle from drinking. Water is vitally important to their health and good cattle feeding economics.

Heretofore a vertical air tube has been placed at a distance from the burner housing and chimney with the bottom of the vertical air tube connected by a passage to the chimney. Such a construction is quite old in the art, as shown by the patent to Schifferle, Patent No. 683,073, patented Sept. 24, 1901, entitled Water Heater.

However, what I propose as my new concept is the provision of at least one further air tube extending vertically and having its lower end connected to a horizontal duct disposed between the burner housing and the lower end of the first air intake tube. In this way an inrush of air into the first air intake tube does not rush at the flame with full force blowing it out because the force of the wind coming down the main air intake tube is dissipated by its possibility of escaping out through the auxiliary air intake tube means.

An additional intake of air is also provided by the extra air intake tube although this is considered a very secondary matter. A further object is to provide a construction as described in which the auxiliary intake tube means is disposed at a considerable distance from the burner housing and main air intake tube in order to provide a heater with the extra advantage of stability and also the lesser likelihood of both the main air intake tube and the auxiliary air intake tube receiving down drafts at the same time.

Still another object is to provide a heater having two auxiliary air intake tubes in addition to the main air intake tube, all considerably spaced apart so as to provide a greater stability in proportion to cost and in proportion to factors relating to best operation.

Still another object is to provide a construction as described in which the auxiliary intake tube means has an opening of lesser size than the main air intake tube means whereby it is less likely to catch down drafts of wind.

This application is a continuation of the applicant's co-pending patent application Serial No. 514,031, filed June 8, 1955, now abandoned.

Other features and advantages of the invention will appear from the following description taken in connection with the drawing, wherein:

FIG. 1 is a plan view of the burner housing with parts broken away;

FIG. 2 is a longitudinal section through the housing taken on line 2—2 of FIG. 1, showing the housing positioned in a tank and also with parts broken away;

FIG. 3 is a longitudinal section through one end of the burner duct with the parts shown on an enlarged scale and also with parts broken away; and FIG. 4 is a side elevational view of the improved water heater showing the device positioned in a watering tank with ends of the tank broken away.

While one embodiment of the invention is illustrated in the above referred to drawings, it is to be understood that they are merely for the purpose of illustration, and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a duct having upwardly extended ends, numeral 14 a burner positioned in the duct and at the bottom of one of said upwardly extended ends thereof, numeral 16 a header extended from the intermediate part of the duct, numerals 18 and 20 air intake tubes with upwardly extended ends 22 and 24, the air intake tubes, header, and duct being positioned in a common horizontal plane, numeral 26 a fuel supply tube on the lower end of which the burner is carried, numeral 28 an air jacket or tube surrounding the fuel supply tube 26, numeral 30 a threaded nipple for connecting a fuel tube 32 to the fuel supply tube 26, and numeral 34 a sleeve adjustably mounted by a clamp 36 on an upper end of a vertically disposed conduit 38 which extends upwardly from one end of the duct 12.

The ends of the clamp 36 are provided with flanges 40 and 42, and a bolt 44 having a thumb nut 46 thereon extends through the flanges 40 and 42 whereby the sleeve 34 is adapted to be adjusted vertically on the end of the vertically disposed conduit 38.

The burner assembly is positioned in the opposite end which forms the burner tube 48 of the duct 12 and, as shown in FIGURE 3, the burner elements are supported by a disc 50 on the upper end of the end 48. The disc 50 is provided with perforations 52 and a central opening 54 through which the tube 28 extends, and the burner is retained in the disc by a cap 56 that is threaded on the upper end of the tube 28. A coupling 58 threaded on the upper end of the fuel supply tube 26 rests upon a web 60 in the end of the cap 56 thereby supporting the tube 26 and burner 14 in the tube 28. The nipple 30 which is provided with a lock nut 62, is threaded into the upper end of the coupling 58, and the fuel tube 32 which is threaded on the upper end of the nipple, extends through a flexible hose 64 to a fuel pump, reservoir, or other fuel supply means.

The burner 14, which is L-shaped, is threaded on the lower end of the tube 26, and an elbow 66 threaded on the lower end of the tube 28 is positioned to surround the burner with a threaded nipple 68 threaded into the end of the elbow 66, providing a combustion chamber at the end of the burner. The upper part of the tube 28 is provided with openings 70 that receive air from the perforations 52 of the disc 50.

The air intake tubes 18 and 20 are secured in bosses 72 and 74, respectively, on the sides of the closed end 76 of the header 16, and the burner assembly is supported on and spaced from a floor 78 of a tank having walls 80 with bricks 82, as shown in FIGURES 2 and 4. The bricks may be fire-bricks, or spacing elements of any suitable material may be used.

With the parts assembled as disclosed and described the burner elements are positioned in a tank or trough, as illustrated in FIGURE 4, and with fuel supplied to the burner through the tubes 26 and 32, the fuel discharged from the burner is ignited and air for combustion is supplied through the tube 28, and also through the header 16 and air intake tubes 18 and 20. By this means the fuel from the burner tip burns in the duct 12 and the gases of combustion are discharged through the conduit 38 and sleeve 34. The position of the sleeve 34 is adjustable on the conduit 38 whereby the combustion of the fuel is adapted to be controlled so that complete burning may be obtained.

Emphasis is to be placed on the arrangement in which extra air intake tubes 22 and 24 carry air to the center of a passage 12 between the burner stack 50 and the conduit 38.

This arrangement has many advantages. One of these advantages is that air above the conduit 38 causing a back pressure down the conduit 38 would otherwise tend to travel through the passage 12 and blow out the flame.

However, with the header 16 and the air openings 22 and 24 this back pressure can travel through the header 16 and out the tubes 22 and 24 relieving pressure and keeping the flame from blowing out.

Another advantage resides in the advantage of supplying air downwardly through the tubes 22 and 24 and into the passage 12 through the tube 16 whereby air in addition to the air supplied through the openings 52 is supplied to the burner.

In addition to the above the header 16 and the crosspipes 18 and 20 add stability to the burner so that it cannot be tipped over by cattle, as is very important as is the reason for having two tubes 22 and 24 instead of just one, as a four-legged stool is more stable than a three-legged stool.

It will be seen that the undersurfaces of the heater duct 12, air intake tube horizontal portions 18 and 20 and of the header 16 actually act as attached means, part of which are adjacent the extremities of the undersurface of the heater for engaging a horizontal supporting surface, which means is positioned to thereby hold the heater upright.

From the foregoing specification, it will become apparent that the invention disclosed will adequately accomplish the functions for which it has been designed and in an economical manner, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

I claim:

1. In a water heater for a stock watering tank, the combination which comprises a header positioned in a horizontal plane, a duct also positioned in a horizontal plane normal to the header and communicating therewith, said duct positioned at one end of the header and extended laterally from both sides thereof, air intake tubes at the end of the header opposite to that on which the duct is positioned, also extended from both sides of the header and also communicating with the header, said header, duct, and air intake tubes being in a common horizontal plane and positioned to form an H, the ends of said air intake tubes being extended upwardly to points above the level of water in a tank in which the heater is positioned, said duct having vertically disposed upwardly extended end portions, one of said end portions of the duct providing a discharge opening, a sleeve adjustably mounted on the upper end of the end portion of the duct providing the discharge opening, the upwardly extended end portion of the duct opposite to the end providing a discharge opening providing a burner tube, a perforated disc positioned on the upper end of the burner tube, a perforated air jacket depending from said disc and positioned in the burner tube, and a fuel supply tube extended vertically through said disc and air jacket and having an L-shaped lower end providing a horizontally disposed burner.

2. A water heater as described in claim 1 in which said air jacket is also provided with an L-shaped lower end having a horizontally lower portion in which latter the horizontal disposed burner of said fuel supply tube is positioned.

3. A stock tank water heater as described in claim 2, wherein the L-shaped lower ends of the fuel supply tube and air jacket are replaceable.

References Cited in the file of this patent

UNITED STATES PATENTS

| | | |
|---|---|---|
| 485,892 | Shivlar | Nov. 8, 1892 |
| 512,191 | Hanrahan | Jan. 2, 1894 |
| 683,073 | Schifferle | Sept. 24, 1901 |
| 694,660 | Muller | Mar. 4, 1902 |
| 736,898 | Whittington | Aug. 18, 1903 |
| 884,875 | Szpor | Apr. 4, 1908 |
| 1,468,561 | Friend | Sept. 18, 1923 |